United States Patent [19]

Yamamoto et al.

[11] Patent Number: 5,404,923
[45] Date of Patent: Apr. 11, 1995

[54] APPARATUS FOR AUTOMATED FUELING OF A LAUNCH VEHICLE

[75] Inventors: Brian S. Yamamoto, Torrance; Oleg A. Chaikovsky, Norwalk; Davoud Manouchehri, Huntington Beach, all of Calif.

[73] Assignee: Rockwell International Corporation, Seal Beach, Calif.

[21] Appl. No.: 67,658

[22] Filed: May 26, 1993

[51] Int. Cl.⁶ .......................................... B65B 3/00
[52] U.S. Cl. ........................... 141/279; 141/94; 141/98; 141/192; 141/232; 141/388; 137/355.2; 137/615; 137/899.1; 244/63; 244/135 R; 901/16; 901/45; 901/47; 73/23.2
[58] Field of Search ............... 141/83, 94, 98, 231, 141/232, 279, 382, 387, 388, 192; 137/355.16, 355.2, 355.24, 899.1, 615; 244/63, 135 A, 135 R; 901/16, 45, 47; 73/23.2, 31.02; 364/559; 439/191, 192, 194

[56] References Cited

U.S. PATENT DOCUMENTS

| H297 | 7/1987 | Schultz | 141/232 |
|------|--------|---------|---------|
| 3,527,268 | 9/1970 | Ginsburgh | 141/232 X |
| 3,642,036 | 2/1972 | Ginsburgh et al. | 141/94 |
| 3,665,148 | 5/1972 | Yasenchak et al. | 901/16 X |
| 3,764,026 | 10/1973 | Olah | 141/232 X |
| 4,192,986 | 3/1980 | Udagawa et al. | 901/16 X |
| 4,517,161 | 5/1985 | Gravina et al. | 73/23.2 X |
| 4,913,657 | 4/1990 | Naito et al. | 439/192 |
| 4,993,463 | 2/1991 | von Meyerinck et al. | 141/387 |

FOREIGN PATENT DOCUMENTS 1261593  10/1989  Japan .................................. 439/192

*Primary Examiner*—J. Casimer Jacyna
*Attorney, Agent, or Firm*—Lawrence N. Ginsberg; Charles T. Silberberg

[57] ABSTRACT

The apparatus for the automated fueling of a launch vehicle includes a mobile fuel line platform assembly for carrying a fuel line assembly. A gross mechanical actuation mechanism provides gross positioning of the platform assembly relative to a fuel tank inlet. A micro-positioning mechanism provides micro-positioning of the fuel line assembly relative to the fuel tank inlet. A floating plate assembly securely connects the fuel line assembly to the fuel tank inlet. Leak detector detects any leaks in the connection between the fuel line assembly and the fuel tank. The present invention augments existing space program hardware thereby removing human involvement and increasing vehicle/environment safety.

12 Claims, 2 Drawing Sheets

APPARATUS FOR AUTOMATED FUELING OF A LAUNCH VEHICLE

BACKGROUND OF THE INVENTION

1. Field of the Invention

This invention relates to the fueling of launch vehicles and more particularly to an apparatus for automatically fueling a launch vehicle.

2. Description of the Related Art

During the process for launching space vehicles, dangerous hypergolic and cryogenic fuels are loaded into tanks at the launch site. Hypergolics are hazardous due to their toxicity, and cryogenics have extreme temperature and pressure requirements. To prevent spills during fueling, high precision is required for the coupling of fuel lines. Key elements in the fueling of space vehicles are maximizing the safety of the personnel and vehicle as well as decreasing the turnaround time and cost.

SUMMARY OF THE INVENTION

The present invention is an apparatus for the automated fueling of a launch vehicle. In its broad aspects, the present invention includes a mobile fuel line platform assembly for carrying a fuel line assembly. Gross mechanical actuation means provide gross positioning of the platform assembly relative to a fuel tank inlet. Micro-positioning means provide micro-positioning of the fuel line assembly relative to the fuel tank inlet. A floating plate assembly securely connects the fuel line assembly to the fuel tank inlet. Leak detection means detect any leaks in the connection between the fuel line assembly and the fuel tank.

The present invention augments existing space program hardware thereby removing human involvement and increasing vehicle/environment safety. Fuel handling is proceduralized to a consistent known time. Additionally, existing technology/hardware may be utilized to keep the cost of such an implementation to a minimum.

BRIEF DESCRIPTION OF THE DRAWINGS

The same elements or parts throughout the Figures of the drawings are designated by the same reference characters.

DETAILED DESCRIPTION OF THE PREFERRED EMBODIMENTS

Figure 1:
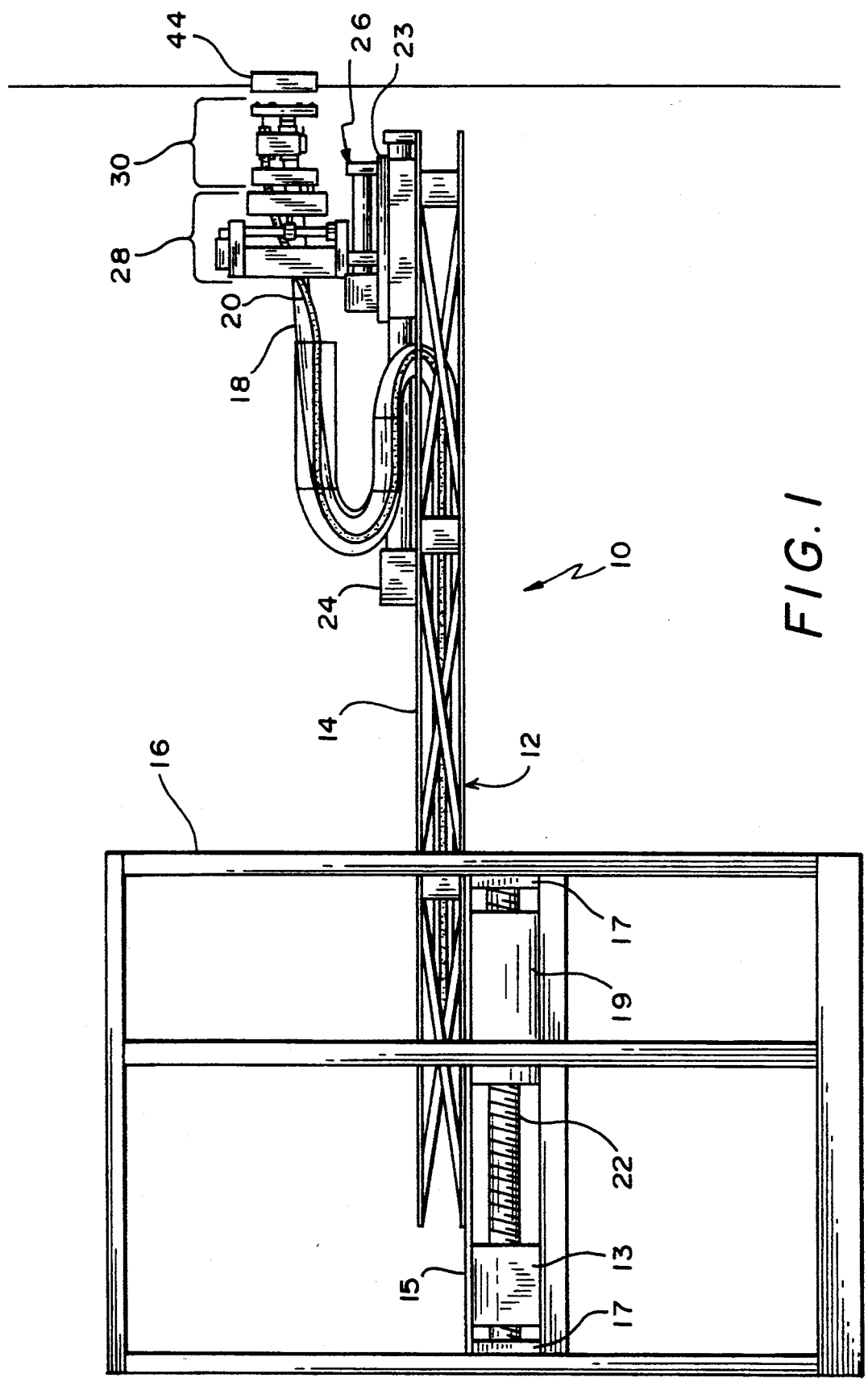
FIG. 1 is a schematic side view of the apparatus of the present invention.

Referring now to the drawings and the characters of reference marked thereon. FIG. 1 illustrates the preferred embodiment of the automated fueling apparatus, designated generally as 10. An extendable fuel line platform assembly, designated generally as 12, includes an elongated horizontal frame 14 actuatable relative to a stationary launch-site structural platform 16. The horizontal frame 14 supports a fuel line 18 and power and data lines 20. Frame 14 is driven relative to the stationary launch-site structural platform 16 by a gross positioning drive assembly 22. Such a drive assembly 22 preferably comprises a conventional ball screw apparatus consisting of a long stationary rotating screw mounted relative to a track and turned by a motor 13 equipped with a gear reduction unit and a resolver used to measure the linear travel of a nut 19. The screw Is mounted through a set of bearings 17 at each end of frame 16. A set of stationary guides 15 is mounted on structural platform 16. Frame 14 is mounted on the nut 19 and is maneuvered by the rotation of the screw causing a displacement of the frame 14. Its motion is restricted to one axis by the screw and a set of linear bearings around the guides 15. It is emphasized that this drive assembly has been shown by way of illustration and not limitation. Other mechanical actuation means may be used instead. For example, a rack and pinion system could be used.

Frame 14 supports a platform 23 on an end thereof. Platform 23 may be actuated along the top surface of the frame 14 by a second gross positioning drive assembly 24 or other gross mechanical actuator means. As shown in FIG. 1, the rotating screws of assemblies 22 and 24 rotate about two spaced, parallel axes.

Platform 23 supports a horizontal micro-positioning drive assembly 26, which is part of a micro-positioning means, designated generally as 28. As will be described in detail below, such micro-positioning means 28 supports a floating plate assembly 30.

Figure 3:
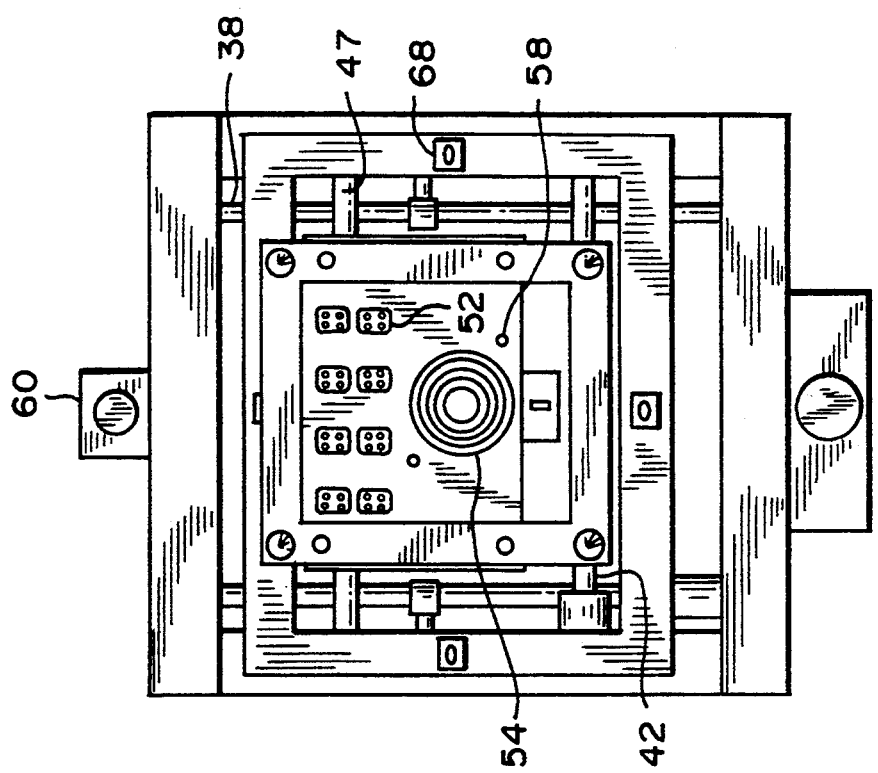
FIG. 3 is a front view of the micro-positioning means and self-mating connector assembly shown in FIG. 2.
Figure 2:
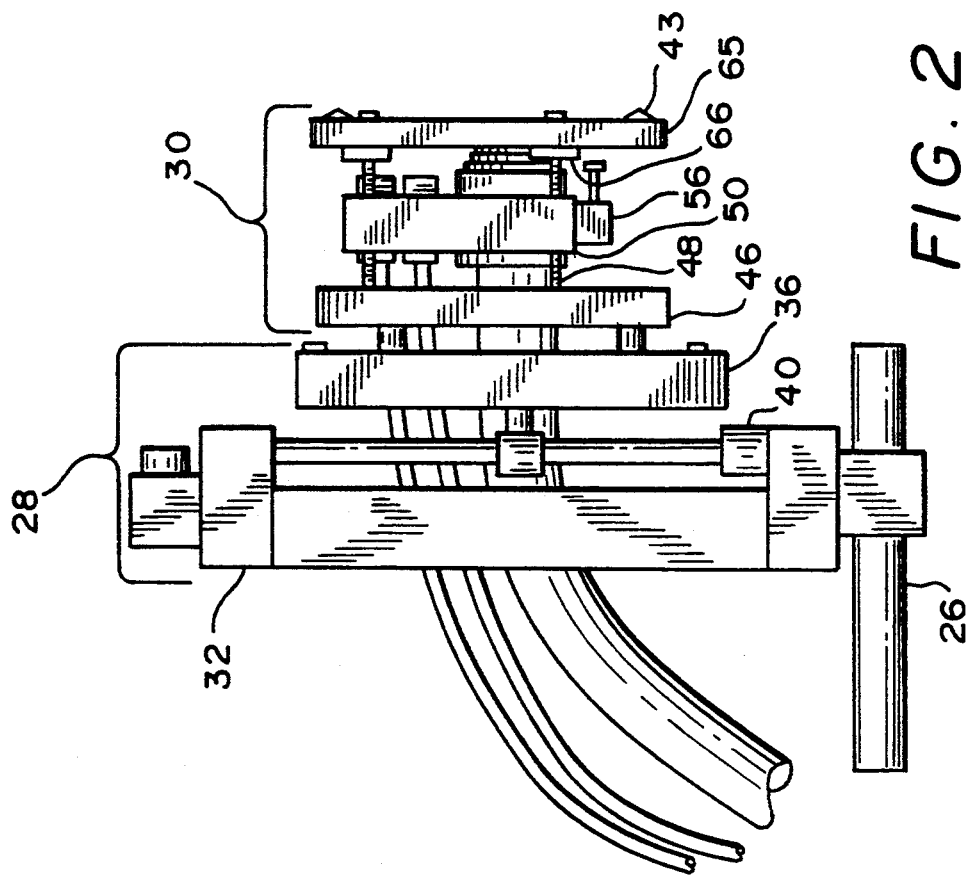
FIG. 2 is an enlarged schematic side view of the micro-positioning means and self-mating connector assembly of the present invention.

Referring now to FIGS. 2 and 3, enlarged views of the micro-positioning means 28 and floating plate assembly 30 are illustrated. The floating plate assembly 30 is actuatable in the horizontal, vertical and lateral axes by the micro-positioning means 28. A micro-positioning support member 32 is supported by the horizontal micro-positioning drive assembly 26. A vertical rail 38 is supported by the support member 32 on one side of that support member 32. On the other side of the support member 32, a vertical micro-positioning drive assembly 40 is supported by the support member 32. The vertical micro-positioning drive assembly 40 provides the desired vertical actuation of an elevating frame element 36 while the vertical rail 38 provides support on the opposite side of tile frame element.

Lateral actuation of the floating plate assembly 30 is provided by a lateral micro-positioning drive assembly 42. This lateral micro-positioning drive assembly 42 is attached to the frame element 36. A lateral rail 47 is attached to the frame element at the end opposite the track drive assembly 42.

The floating plate assembly 30 comprises a floating connector plate support frame 46 attached to the lateral rail 47 and the lateral track drive assembly 42. Four spring loaded bolt assemblies 48 are attached to the floating connector plate support frame 46. These spring loaded bearings may comprise, for example, a threaded pin/bolt going through a monoball bearing and a spring as a sleeve followed by another monoball bearing, spacer and a nut. The monoball is fixed oil the two structures that are moving relative to one another. The nut on this assembly provides for adjustment of the pre-load on the spring. A floating connector plate 50 is attached to the support frame 46 by both assemblies 48 and is separated from the support frame 46 by the springs in the bolt assemblies 48.

An interface plate 65 Is also attached to the support frame by the bolt assemblies, separated again by a second set of springs. The interface plate 65 provides compliance through the springs and is equipped with a plurality of chamfers 43 to reduce the complexity of the mating process. These chamfers 43, are tapered pins which physically draw the plate to the proper alignment with a conically shaped guide hole on the fuel tank.

A number of self-mating electrical connectors 52 are attached to the connector plate 50 for mating associated connectors on the fuel tank inlet 44.

A self-mating fuel line connector 54 is connected to the end of the fuel line 18 for mating with the fuel tank inlet 44. The floating connector plate 50 is driven by a locking motor 56.

The locking motor 56 has a key attached to the end of its shaft which allows it to lock into the fuel tank inlet 44 when the shaft is rotated in one direction by 90 degrees. Once locked, the reverse rotation of the shaft pulls the floating connector plate until the self-mating connectors have locked.

A force sensing system 66 is utilized to monitor the amount of forces and torques being exerted on the fuel tank inlet 44 by the interface plate 65 ensuring that no damage is done to either the vehicle or the robotic hardware. It also aids in completing the mating process.

Proximity sensors 68 such as laser or infrared sensors, may be provided to aid in completing the mating process and ensure that there is no damage to hardware.

Leak detection may be provided by gas concentration sensors 58 attached to the plate 50 adjacent to the fuel line connector 54 for detecting any leaking fluids.

A vision sensor system 60 may be utilized for aiding in the alignment of the floating plate assembly 30 with the fuel tank inlet 44.

The term gross positioning as defined herein refers to bringing the floating plate assembly 30 to within 0.85"±0.25" of the fuel tank inlet 44 with ±5 degrees rotational accuracy in all three axes.

As used herein, the term micro-positioning refers to bringing the floating plate assembly 30 to 0.1±0.05" in 3 axes of the fuel tank inlet 44 with ±3 degrees rotational accuracy in all 3 axes. Micro-positioning requires higher accuracy and therefore a more accurate means of measuring the travel must be employed. This is accomplished through the use of laser or infrared proximity sensors, or an inductance scale.

In operation, each of the drive assemblies are actuated individually, simplifying the operation and reducing the build-up of mechanical inaccuracies and errors.

The vision sensor system 60 identifies the target, i.e. the fuel tank inlet 44 on the vehicle. It determines the target position in 3-D space. The controller uses this data to solve the inverse kinematic equations, determining the new position for each drive assembly. This procedure continuously operates on updated sensor data throughout the mating sequence to compensate for system inaccuracies.

The first gross positioning drive assembly 22 is actuated until it reaches its proper location, as determined from the sensor data, driving frame 14 to its fully extended position. The second gross positioning drive assembly 24 is then actuated until it reaches its proper location. This completes the gross positioning phase of the operation and the micro-positioning means 28 is at the appropriate distance to begin the micro-positioning and mating sequence. Both the vertical drive assembly 40 and lateral drive assembly 42 position the floating plate assembly 30 in the appropriate position for mating. Sensor feedback is received by the proximity sensors, force torque sensors, machine vision, laser or infrared sensors to determine the distance from the target fuel tank inlet plate. Once the sensor feedback has determined that the vertical and lateral positions are correct, the horizontal track drive assembly 26 drives the support member 32 and all of the attached hardware, towards the fuel tank inlet. The chamfers help guide the compliance plate 65 to mate with the fuel tank inlet plate. When the compliance plate 65 is mated with the fuel tank inlet plate, the key from the locking motor 56 Is inserted into the fuel tank inlet keyhole. The motor Is activated and the rotation of the shaft pulls the floating connector plate towards the fuel and electrical connectors on the fuel tank inlet connector plate, until all electrical and fuel connections are soundly mated.

Throughout the operation, the camera system 60 is used to close the position control loop between the two connector plates while resolvers and encoders close the control loop for each actuator.

Obviously, many modifications and variations of the present invention are possible In light of the above teachings. It is therefore to be understood that, within the scope of the appended claims, the invention may be practiced otherwise than as specifically described.

What is claimed and desired to be secured by Letters Patent of the United States is:

1. An apparatus for the automated fueling of a launch vehicle while said launch vehicle is maintained in a stationary position, comprising:
  a) a mobile fuel line platform assembly for carrying a fuel line assembly;
  b) gross mechanical actuation means comprising a plurality of linear displacement drive systems having spaced parallel axes for providing gross positioning of said platform assembly relative to a fuel tank inlet;
  c) micro-positioning means comprising a 3-axis linear displacement drive system for providing micro-positioning of said fuel line assembly relative to said fuel tank inlet;
  d) a floating plate assembly having a self-mating connector for securely connecting said fuel line assembly to said fuel tank inlet; and,
  e) leak detection means for detecting any leaks in the connection between said fuel line assembly and said fuel tank.

2. The apparatus of claim 1 wherein said micro-positioning means a vision sensor system for aiding in the alignment of said fuel line assembly with said fuel tank inlet.

3. The apparatus of claim 1 further comprising a force sensing system for aiding in the alignment of said fuel line assembly with said fuel tank inlet.

4. The apparatus of claim 1 wherein said leak detection means comprises a gas concentration sensor for detecting any fuel leaks.

5. The apparatus of claim 1 further comprising proximity sensors for aiding in completing the mating process between said fuel line assembly and said fuel tank inlet.

6. The apparatus of claim 1 wherein said fuel line assembly comprises:
  a fuel line; and,
  power and data lines.

7. The apparatus of claim 1 wherein said mobile fuel line platform assembly comprises:
  an elongated horizontal frame actuatable relative to a stationary launch-site structural platform; and
  a platform supported on an end of said horizontal frame.

8. The apparatus of claim 7 wherein said micro-positioning means comprises a plurality of micro-positioning drive assemblies.

9. The apparatus of claim 7 wherein said micro-positioning means comprises:
  a) a horizontal micro-positioning drive assembly supported by said platform;
  b) a support member supported by said horizontal micro-positioning drive assembly;
  c) a vertical fall supported by said support member for supporting said floating plate assembly;
  d) a vertical micro-positioning drive assembly supported by said support member, said vertical drive assembly for providing the desired vertical actuation of said floating plate assembly;
  e) a frame element supported by said vertical rail and said vertical drive assembly;
  f) a lateral rail supported by said frame element; and
  g) a lateral micro-positioning drive assembly supported by said frame element for supporting said floating plate assembly and for providing the desired lateral actuation thereof.

10. The apparatus of claim 9 wherein said floating plate assembly comprises:

a connector plate support frame attached to said lateral rail, and to said lateral micro-positioning drive assembly;

a plurality of spring loaded bolt assemblies attached to said connector plate support frame;

a floating connector plate attached to said plurality of spring loaded bolts;

a plurality of self mating electrical connectors attached to said floating connector plate for mating with associated connectors on a fuel tank inlet;

a self-mating fuel line connector connected to the end of a fuel line of said fuel line assembly and attached to said floating connector plate for mating with said fuel tank inlet;

a motor for driving said floating connector plate to said fuel tank inlet; and, an interface plate attached to said plurality of spring loaded bolts for providing compliance for said floating plate assembly.

11. The apparatus of claim 10 wherein said interface plate comprises a plurality of chamfers for mating with associated receptacles on said fuel tank inlet.

12. The apparatus of claim 11 wherein said leak detection means comprises at least one gas concentration sensor attached to said floating connector plate and adjacent to said fuel line connector for detecting any leaking fluids.

* * * * *